(12) United States Patent
Buckholdt

(10) Patent No.: US 12,020,277 B2
(45) Date of Patent: Jun. 25, 2024

(54) OPTIMAL TRANSACTION ITEM GROUP PROCESSING

(71) Applicant: NCR Voyix Corporation, Atlanta, GA (US)

(72) Inventor: Wayne Lawrence Buckholdt, Duluth, GA (US)

(73) Assignee: NCR Voyix Corporation, Atlanta, GA (US)

(*) Notice: Subject to any disclaimer, the term of this patent is extended or adjusted under 35 U.S.C. 154(b) by 0 days.

(21) Appl. No.: 17/245,124

(22) Filed: Apr. 30, 2021

(65) Prior Publication Data

US 2021/0248638 A1 Aug. 12, 2021

Related U.S. Application Data

(63) Continuation of application No. 16/287,600, filed on Feb. 27, 2019, now Pat. No. 11,062,343.

(51) Int. Cl.
*G06Q 30/02* (2023.01)
*G06Q 30/0238* (2023.01)

(52) U.S. Cl.
CPC .............................. *G06Q 30/0238* (2013.01)

(58) Field of Classification Search
CPC .............. G06Q 30/02; G06Q 30/0269; G06Q 30/0201; G06Q 30/00; G07G 1/14
See application file for complete search history.

(56) References Cited

U.S. PATENT DOCUMENTS

| 10,438,221 B2* | 10/2019 | Barbieri ................ G06F 16/951 |
| 2006/0229927 A1* | 10/2006 | Humphries ........... G06F 9/5061 |
| | | 705/7.22 |
| 2008/0021771 A1* | 1/2008 | Wu ........................ G06Q 30/00 |
| | | 705/14.23 |
| 2008/0306948 A1* | 12/2008 | Uppala ............... G06F 16/2425 |
| 2013/0024256 A1* | 1/2013 | Wolf ....................... G06Q 30/02 |
| | | 705/14.34 |
| 2013/0024264 A1* | 1/2013 | Leffert ................... G06Q 30/02 |
| | | 705/14.26 |
| 2013/0060621 A1* | 3/2013 | Walker ................... G06Q 30/02 |
| | | 705/14.23 |
| 2014/0180806 A1* | 6/2014 | Boal ..................... G06Q 10/107 |
| | | 705/14.53 |
| 2014/0304052 A1* | 10/2014 | Watanabe ................ G07G 1/14 |
| | | 705/14.23 |
| 2017/0017968 A1* | 1/2017 | Bhattacharjee .... G06Q 30/0201 |

* cited by examiner

*Primary Examiner* — Saba Dagnew
(74) *Attorney, Agent, or Firm* — Schwegman Lundberg & Woessner, P.A.

(57) ABSTRACT

A set of values and a condition are provided. The values are sorted and placed in zones based on the condition and first rules. The values are grouped into combinations within select ones of the zones based on second rules while other zones are excluded. Sizes of the combinations are modified and the values are regrouped into new combinations and re-evaluated in view of the second rules. A final combination of the values is identified using third rules. The final combination representing an optimal grouping of the values based on the condition.

20 Claims, 4 Drawing Sheets

OPTIMAL TRANSACTION ITEM GROUP PROCESSING

CROSS-REFERENCE TO RELATED APPLICATION

This application is a continuation of U.S. patent application Ser. No. 16/287,600, filed Feb. 27, 2019, which application and publication are incorporated herein by reference in their entirety.

BACKGROUND

Discounts on goods and services have increased as more and more retailers and manufacturers complete for consumers. The consumer can now be engaged by the retailer of a plethora of communication channels for purposes of enticing the consumers with coupons. These communication channels include, print media, voice calls, electronic devices (phone, tablets, laptops, desktops, wearable processing devices, Self-Service Terminals (SSTs), digital signs, etc.), and software applications (web browser, mobile applications, email, social media, text messaging applications, etc.).

Typically, when a consumer checks out with a retailer, the consumer provides mix of coupons (electronic or in print media) for one or more items in the consumer's transaction. In most cases, an item cannot be associated with multiple discounts. That is, a single item can only be associated with one of the available coupons even though that single item could be used with multiple different coupons. This prevents coupon "stacking" as it is known in the industry. Each coupon may also have a variety of individually stated conditions that have to be satisfied before the consumer is eligible to redeem that coupon.

Unfortunately, most consumers do not know in advance what mix of items they want to purchase at a store and therefore they do not preplan to find the best mix of coupons. Also, cashiers in customer-assisted checkouts do the best that they can to guess at the best mix of coupons for any given transaction but approaches become highly inaccurate as the number of items in a given transaction increases.

A variety of software-based solutions have been proposed in the industry. However, these solutions are unrealistic and impractical because they are computational expensive and even with a powerful computing device can take an unacceptable amount of time to solve in the retail environment, where a retailer may have lines of consumers waiting to check out.

SUMMARY

In various embodiments, methods and a system for optimal transaction item group processing are presented.

According to an embodiment, a method for optimal transaction item group processing is presented. Specifically, and in one embodiment, item values are sorted into zones based on first rules and a condition associated with the values. The item values are grouped into first combinations of a current size based on the zones. A particular combination is selected from the first combinations based on second rules. The current size is increased and the processing iterates back for grouping second combinations until current size is greater than a total number of values or until a threshold size is reached. A final combination of the values is determined as an optimal grouping of the values for the condition using third rules.

DETAILED DESCRIPTION

Figure 1:
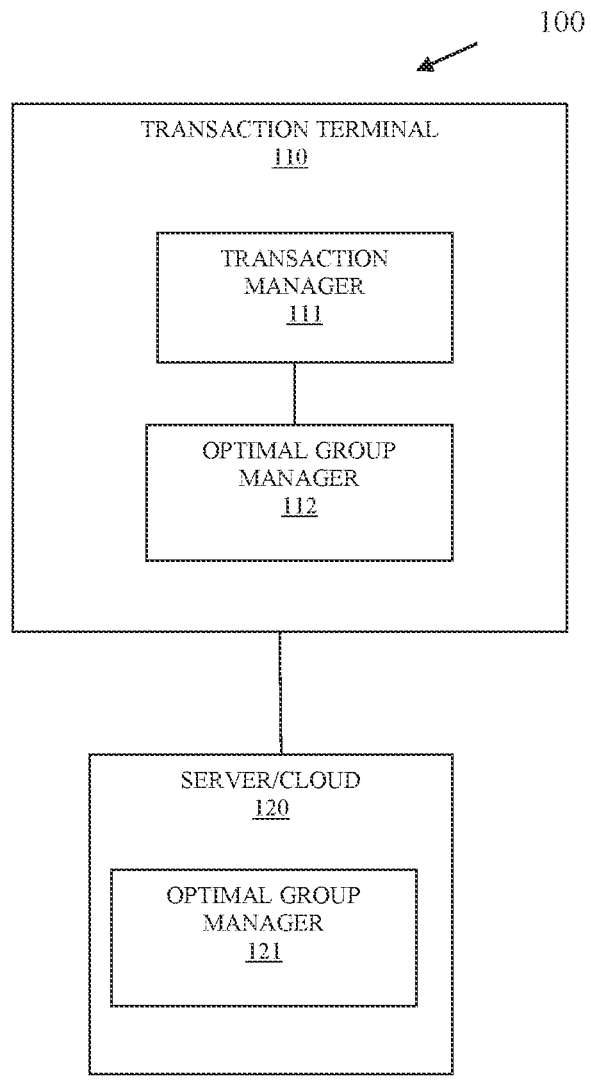
FIG. 1 is a diagram of a system for optimal transaction item group processing, according to an example embodiment.

FIG. 1 is a diagram of a system 100 for optimal transaction item group processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of optimal transaction item group processing presented herein and below.

As will be more completely discussed herein and below, the teachings provide a processor and memory efficient technique for identifying an optimal grouping of items in a transaction when provided a given set of available coupons. Moreover, the optimal item grouping and coupon mix are identified in a short period of time, which is time efficient. That is, the technique presented herein solves the aforementioned problems faced by the industry in a practical and realistic fashion.

More specifically, a novel heuristic algorithm is described evaluates the most promising item and coupon combinations rather than exploring every possible combination.

Exploring every possible combination of item coupon combination is a factorial problem (e.g., n!, 2!=2, but 10! is already 3,628,800). The factorial nature of the problem is precisely why the existing industry solutions are computationally (processor load and memory load) expensive and why the elapsed time to solve this problem with existing solutions is impractical even with a powerful computer (a transaction with 20 items may be impossible to solve with existing solutions as 20! is 2,432,902,008,176,640,000).

The system 100 includes a transaction terminal 110. The transaction terminal 110 includes: a transaction manager 111 and an optional optimal group manager 112. The system 100 also includes a server/cloud 120 having an optimal group manager 121.

The transaction manager 111 and the optimal group manager 112 (when present) are implemented as executable instructions that reside in a non-transitory computer-readable storage medium of the transaction terminal 110. At least one hardware processor of the transaction terminal 110 executes the executable instructions from the non-transitory computer-readable storage medium to perform the optimal transaction item group processing discussed herein.

Similarly, the optimal group manager 121 is implemented as executable instructions that reside in a non-transitory computer-readable storage medium of the server/cloud 120.

At least one hardware processor of the server/cloud executes the executable instructions from the non-transitory computer-readable storage medium of the server/cloud 120 to perform the optimal transaction item group processing discussed herein.

During any given transaction on the transaction terminal 110, a consumer is checking out of a retail establishment with multiple items and presents a set of discounts/coupons that are to be applied against the transaction in compliance with each coupon's stated conditions to reduce a total price for the transaction. The item codes are either scanned by a scanner or item codes are entered on a touchscreen interface at the transaction terminal 110 during the checkout.

The transaction manager 111 obtains the item codes and performs a lookup (with a server database or a local database on the terminal 110) for the item codes to obtain the item prices for each item as the item codes are received. The transaction details include the item code, item descriptions, and item price for each item. The transaction manager 111 builds the transaction details and maintains a running total price for the transaction (which may or may not be presented in real time on a transaction display associated with the consumer and/or presented in real time on a transaction display that is separately associated any cashier that may be operating the transaction terminal 110).

Upon processing a last item code, the transaction manager 111 receives coupons that are being proposed to apply against items of the transaction or the transaction as a whole. These coupons or discounts can be scanned by a scanner at the transaction terminal 110, entered through the touchscreen, obtained from an electronic account linked to the consumer, etc.). Each coupon has its stated conditions for redemption, which is obtained by the transaction manager 111 or which is electronically embedded in the barcode/Quick Response (QR) code entered.

It is to be noted that the coupon codes can be entered or received before or during the transaction processing by the transaction manager 111 and retained separately until the last item code is processed. That is, in this embodiment, the transaction manager 111 maintains any received coupons in a list that is expected only after all items for the transaction are processed.

Once the item codes, item prices, item quantities per item, and coupon codes for the coupons along with the coupon conditions are received by the transaction manager 111, this information is provided by the transaction manager 111 as input to the optimal group manager 121 and/or 111 (in cases where the optimal group manager 112 is executing and accessible on the transaction terminal 110).

Before discussing the novel processing of the optimal group manager 121, some initial details and context with respect to the coupon conditions are provided.

As used herein a "grouping" and a "combination" may be used interchangeably and synonymously herein. A grouping refers to a select set of items and that set's assignment to a given coupon that is being processed.

The conditions of the coupons fall into four types of coupons, with each item in the transaction being eligible for only one coupon (i.e., no "stacking"): (1) Dollar Off Dollar coupons, which are coupons that grant a discount when the value of the item group exceeds a minimum buy condition. One common coupon of this type is a $5 off $15 coupon, which awards a $5.00 discount when the value of the items exceeds $15.00. Although the coupon lists a $15.00 buy condition, the actual amount is $14.85, since the internal minimum buy condition is normally set to 99% of the coupon face amount. Given this, a customer will be granted a $5.00 discount, if a $14.99 item is purchased, a $9.99 item and a $4.99 item are purchased, or any combination of items whose total exceeds $14.85. This is the hardest of the four coupon types to find an optimum solution for, as the number of possible combinations grows very fast as the number of items and number of Dollar Off Dollar coupons in the transaction increases. (2) Percent Off Item coupons, which are coupons that grant a discount of a certain percentage, such as 20% off a $9.99 item, or $2.00. (3) Dollar Off Item coupons, which are coupons that grant a specific dollar amount, such as $3.00 off a $7.99 item, with the discount being limited to the actual value of the item. (4) Percent Off Transaction coupons, which are coupons that grant a percentage discount to all the items in the transaction that did not receive any other best deal discount, such as a 10% off transaction discount that applies to a $17.99, a $5.49, and a $3.99 item.

Furthermore, each of the four best deal coupon types can specify either an inclusion or an exclusion product group, which makes finding the optimum solution considerably more difficult when there are items in the transaction that are excluded from some but not all of the coupons.

As will be discussed below, the optimal group manager 121 performs a rules-based (heuristic) evaluation on a per coupon basis to identify an optimal grouping (set of items) from the entire set of items that will yield the largest price discount for a consumer during a transaction at the transaction terminal 111. Initially, the available coupons and coupon types are evaluated during an initial pass during which some item to coupon types may be assigned. A recursive algorithm is used for the Dollar off Dollar coupons. Once an assignment is made to a set of items from the available items listed in the transaction to a specific coupon, the optimal group manager 121 iterates to a next available coupon for the transaction with the prior optimal grouping of items excluded from consideration in the next iteration. The rules provide for one or more final post processing optimizations, and the methodology that the optimal group manager 121 performs varies based on a type of coupon that is being processed during any given iteration.

Largely, the most difficult problem to solve is finding an optimal grouping for a given coupon that has a coupon type of dollar off dollar. Thus, dollar off dollar type coupons are identified and handled first by the optimal group manager 121. If there are multiple dollar off dollar type coupons, each such coupon is associated with its own iteration to identify sub-optimal groupings. Any subsequent iteration removes those items that were assigned to a prior iteration's sub-optimal grouping, such that as the iterations progress with each additional dollar off dollar coupon available for a given transaction, the available items that remain is decreased. During each iteration if an item is not assigned to the optimal grouping being produced by that iteration, that particular ungrouped item is identified as an ungrouped item. Furthermore, each iteration is a recursive process (which entails one or more layers of its own nested looping). With a single iteration, recursive loops are performed where the available items for that iteration are pre-grouped into pairs of a predefined length. The first pass of a given single iteration restricts the size of the pairs to 2, on each pass (recursive call within a single iteration) the size of the groupings that are to be considered is increased by 1 (so a second loop has a maximum sized grouping that is considered to be 3). This continues until the recursion reaches the maximum sized grouping. The maximum sized grouping is determined dynamically immediately before the evaluation of each dollar off dollar coupon and is dependent upon the remaining item prices and the dollar off dollar coupon's minimum buy condition. To determine the maximum sized grouping the programs adds the smallest priced items in the transaction in order until the total exceeds the minimum buy condition. Once this total is reached or exceeded, the number of items counted is the maximum sized grouping. Worst case it is equal to the number of items in the transaction that remain to be grouped, but it is typically much less.

Initial Processing Step Splitting the Transaction Items into Zones

The optimal group manager 121 determines each coupon's redemption value based either on the stated dollar amount of the coupon or based on the stated percentage of that coupon. If a dollar off item redemption value exceeds the dollar off dollar redemption value, then the item associated with the dollar off item is assigned to the dollar off item coupon and removed from the available items and the dollar off dollar coupon is processed in the manner discussed below.

When there is a dollar off dollar being compared against a percent off item coupon, a price cutoff is calculated to determine if the specific item should be preassigned to the percent off item coupon.

The optimal group manager 121 determines price cutoff value for a dollar off dollar coupon versus a percent off specific item coupon as follows:

price cutoff=dollar off dollar coupon redemption value*(100/percent off item redemption value).

For example, a dollar off dollar coupon of $5 off $10 and a percent off item of 30% has a price cutoff value of $16.67 calculated as:

$5 (100/30)=$16.67.

When the price cut off between a dollar off dollar coupon and percent off item coupon exceeds the dollar off dollar redemption value. The item associated with the percent off item coupon is removed from consideration from the available items in the transaction and is preassigned to the percent off item coupon. The remaining unassigned items and the dollar off dollar coupon are then processed as discussed below.

In this way, the optimal group manager 121 enforces an initial rule before performing optimal grouping and coupon assignments to account for dollar off item coupons or percent off item coupons that are deemed to be of more value (in maximizing the overall transaction discount value) than the available dollar off dollar coupons. Any items preassigned to a dollar off item or percent off item coupon are removed from the available items in the transaction and next processed through the dollar off dollar algorithm of the optimal group manager 121.

Items purchased in the transaction are put into sorted order, as this leads to a number of optimizations. Once done the optimal group manager 121 splits up the items into four zones. The items that are above the "price cutoff", the ungrouped zone, are those for which an item level coupon will always deliver the "best deal." For instance, if a 20% off item coupon is available and the Dollar Off Dollar group coupon is a $5 off $15 coupon, the price cutoff is calculated as $25.00 (5*(100/20)=25), as above this amount applying a 20% discount off the item delivers a better deal. For instance, 20% off a $30.00 item is $6, while a $5 off $15 coupon would only result in a discount of $5. Note that if no percent off item or percent off transaction coupons are in play, there is no price cutoff, which means all items can be used to satisfy a Dollar Off Dollar group.

The second zone, the provisional zone, lies between the threshold condition (typically one percent above the minimum buy condition) and the price cutoff point. In this zone, it may be better for the item to be a part of a group or it may not. To determine this, after the initial passes have completed the optimal group manager 121 makes an additional pass for each item in the provisional zone, in which the lowest priced item in the provisional zone is used first. Once the total savings starts to decline, the optimal group manager 121 stops consuming additional provisional items.

The third zone, the automatic acceptance zone, are the items that are between the minimum buy condition ($14.85 for a $5 off $15 coupon) and the threshold amount ($15.00 for a one percent threshold). These items, such as a $14.99 item, are automatically accepted as a single item group.

Once the items from the ungrouped, provisional, and automatic acceptance zones have been eliminated from further consideration, the remaining items fall into the evaluation zone. For items priced below the minimum buy condition, two or more items are required to form a group and the combination must be evaluated.

As an example, if several $5 off $15 coupons and 20% off item coupons are in play and the items presented in the transaction are priced at $29.99, $19.99, $14.99, $9.99, $6.99, $2.99, and $1.97, the $29.99 item would go into the ungrouped group, the $19.99 item into the provisional item group, the $14.99 item into the automatic acceptance group, and the $9.99, $6.99, $2.99, and $1.97 items into the evaluation group.

Second Processing Step—Two Item Primitive and Recursion

Once the single items that fall into the ungrouped or provisional groups have been set aside, and the single items that fall into the automatic acceptance zone have been allocated to single item groups (one item for each available Dollar Off Dollar coupon group), the optimal group manager 121 moves on to two item groups if any Dollar Off Dollar coupons remain.

The two-item group is the foundation upon which all the larger groups rely and it is the basis for a recursive algorithm. The optimal group manager 121 divides the remaining buy condition in half. Since the function that finds two item groups can be recursively called, the remaining amount varies, but initially for a $5 off $15 coupon ($14.85 buy condition), the halfway point is calculated as $7.43 ($14.85/2). Once done, the optimal group manager 121 uses a binary search (a maximum of seven compares for an item list of less than 128 items) to quickly divide the item evaluation group into a top group (those items at or above the halfway point) and a bottom group (those items below the halfway point). Note that the top and bottom group are typically not equal in size and in fact, either one can be empty.

What is interesting about the top and bottom groups is that they have special properties. First, no two items from the bottom group can meet the minimum buy condition, which means all those combinations can be eliminated. Second, the optimal two-item group is either: the two lowest valued items from the top group or a combination of one item from the top group and one item from the bottom group. An example is shown below:

$12.99
$9.99
Too Group Above
$7.99
$7.49
—Half Minimum Buy Condition (imaginary $7.43)
$6.49

$5.29
$4.99
Bottom Group Below
$3.99
$1.97

In the example above, the lowest two items from the top group total $15.48. Since the items are in sorted order there is no other combination of two items from the top group that will be lower than this. Thus, the only remaining combinations that need to be tried are one item from the top group and one item from the bottom group. However, again not all combinations need to tested, as once an item is chosen from the top group there is only one item from the bottom group that is its best match (i.e. the item closest to the remaining buy amount). For instance, once the $12.99 item is chosen, the optimal group manager 121 looks for the first item that is at or above the remaining buy amount ($14.85-$12.99 or $1.86). Using a linear search starting at the end of the bottom group the best match for the $12.99 item will be found after only one compare, giving $12.99+$1.97 or $14.96. And because this particular combination falls at or below the one percent threshold condition of $15.00, it will be automatically accepted without further searching. Note that the other candidate for the best two item grouping is $9.99+$4.99 or $14.98, which is also automatically accepted.

The optimal group manager 121 quickly rejects all other combinations for the above item set, since $7.99+$6.49 (total $14.48) falls short of the minimum buy condition. Thus, all combinations below it, such as the $7.49 item from the top group and the $6.49 item from the bottom group can be ignored. It is through this process of eliminating dead ends as soon as possible that the optimal group manager 121 arrives at a solution in an astonishingly short time.

When the list contains a much larger set of items, a binary search can be used to quickly narrow down the combinations. For instance, if the evaluation group consists of 30 items and 10 of those items fall in the top group and 20 items in the bottom group, the number of two item combinations that need to be evaluated is only about 50. This is derived from the number of items in the top group, 10, times about 5, which is the average binary search depth for the item in the bottom group that would result in the top item's best match.

All the groups that fall within the one percent threshold are automatically accepted and their associated items are removed from the item list, which further speeds processing. For the above example, the two item groups that are automatically accepted are $12.99 and $1.97 (total $14.96) and $9.99 and $4.99 (total $14.98). Should no two-item group fall within the one percent threshold, the optimal group manager 121 remembers the best combination that was not selected and saves it as a provisional group. In this particular case, the items remain in the item list for further evaluation as a member of a larger size group. For the example above, the provisional group would be the $7.99 and $7.49 items, which total $15.48.

Third Processing Step—Finding Three Item or Larger Groups

Once the two item groups have been found and their associated items removed from the item list, the algorithm then searches for three item groups, then four item groups, etc. on up to the predetermined maximum group size. For the example above, the maximum size group that will be searched for is four items, as the four items of least value ($1.97, $3.99, $4.99, $5.29) total $16.24, which is more than the minimum buy condition. The way the optimal group manager 121 works for an N sized group is to divide the group into a top and bottom group, select one item from the top group, and then find its best match by doing a recursive call for a group of one less in size on the remaining items.

After all the three item and larger groups are found that fall within the threshold condition ($15.00 for a one percent threshold on a buy condition of $14.85), the optimal group manager 121 then applies the best provisional group that was found and removes those items from the item list. If enough items remain to satisfy another Dollar Off Dollar coupon and such a coupon still remains, the optimal group manager 121 repeats, after which it will accept the best provisional group that was found on the next pass.

Processing Optimizations

To further reduce processing time to find the optimal grouping, the optimal group manager 121 performs a number of optimizations including:

(1) Skipping all items that are of the same value when searching for a group combination. For instance, if three items are priced at $4.99, only one of those items will be considered when matching an item from the top group with the bottom group, as the results would be the same. Note that due to the recursive nature of the calls, multiple items of the same value may appear in a group. For instance, a three-item group could choose one of the three $4.99 items and the two item group could choose the other two $4.99 items if those two items were the lowest two items from the top group, giving a group total of $14.97.

(2) Skipping further processing when the N most valuable items in the item list will not satisfy the remaining buy amount for the group of N items. For instance, if the remaining buy amount is $8.25 on a recursive call for a three item group and the items that remain are $1.99, $1.79, $1.79, $1.29, and $0.98, there is no need to evaluate any combinations, since $1.99+$1.79+$1.79, or $5.57 is less than the remaining amount required.

(3) Skipping any other combination for consideration, when the bottom N items of a recursive N item group call meets or exceeds the remaining amount required to meet the minimum buy condition. For instance, if the remaining buy amount is $4.26 on a recursive call with four items remaining to be chosen and the remaining items in play are $11.48, $7.69, $3.24, $1.79, $1.29, $0.99, and $0.39, then the best possible match is the bottom four items of $4.46 and no other combinations need to be considered.

(4) Reducing the walking of the item and group arrays by embedding the number of items in the list and their total in the first array element of the array. By doing this, when items are removed from the item array or when items are added to a pending dollar off dollar group, the number of items remaining and the total can be quickly known without having to walk the entire item array or dollar off dollar group.

Optional Processing Steps

Since the optimal group manager 121 typically completes a pass in well under a thousandth of a second, a variety of additional optimizations can be processed to obtain the optimal item groupings and coupon assignments for a given transaction, such as:

(1) A pass that replaces each two item or larger group with an alternative group to see if a better solution is found. To do this, the optimal group manager 121 keeps a signature of each group that is found, so that the same group won't be selected in the next pass. By doing this, a two-item group that totals $14.94 might be replaced with a three-item group that totals $15.26, which may result in a higher value item being left for say a 20% off item coupon.

(2) A pass that selects each of the provisional items in turn (i.e. those that fall between the threshold amount and the price cutoff) to see if that results in a better overall total savings. For efficiency, this processing stops as soon as the total savings starts to decline.

(3) A pass that uses different threshold values, which determines when a group is automatically accepted. Based on experimental results, the other threshold values that work well are 0.5% ($14.92 for a $14.85 buy condition, which works well when many of the items are close in value), 5% ($15.59 for a $14.85 buy condition), and 10% ($16.34 for a $14.85 buy condition). For efficiency, the 5% and 10% threshold passes are only run if a provisional group was previously found within that dollar range during the 1% threshold pass.

(4) A pass that removes the single-item groups one-by-one to see if this results in a better total savings. For efficiency, this pass is stopped as soon as the total savings starts to decline.

(5) A pass that reserves the reserves the highest priced items for Percent Off Item coupons when there are more Percent Off Item coupons than Dollar Off Dollar coupons.

(6) A pass that uses the item level discounts from the previous coupon scan, so that the coupon revokes that occur when an item level coupon is moved to a different coupon are minimized.

(7) A pass that processes only item level coupons when no Dollar Off Dollar coupons are present.

In addition, if all the items in the transactions were consumed, the processing can be called again with one less coupon of the same type that was last scanned. If this results in a better overall savings, those results will be used instead.

Rules are used to determine the optimizations taken by the optimal group manager 121.

Item Substitution

To generate the best possible total savings, after each pass of the optimal group manager 121, the optimal group manager 121 calls two item substitution methods that substitute ungrouped items for grouped items. Provided one of the item substitution calls results in a total savings that is equal to or greater than before this process is repeated up to four times. For example, in one of the best deal use cases, one of the $5 off $15 groups that is formed contains the following four items:

$4.24, $4.24, $3.99, $2.49, whose total is $14.96

While the ungrouped item list (those items not assigned to a Dollar Off Dollar coupon) contains:

$3.49, $3.49, $1.99, and 0.99

With two 20% off item and one 10% off item coupon in play, the goal is to maximize the value of the first three ungrouped items. This can be accomplished by substituting one or more ungrouped items for a grouped item. In this example, if the ungrouped $3.49 and $0.99 items (underlined in the above) are substituted for the $4.24 item highlighted in yellow, the Dollar Off Dollar group becomes:

$4.24, $3.99, $3.49, $2.49, $0.99, whose total is $15.20;
while the ungrouped item list becomes:
$4.24, $3.49, and $1.99

Although the new Dollar Off Dollar group total is not as optimal, the value of the two 20% off item and 10% off item discounts increases by 15 cents from $1.60 ($0.70+$0.70+$0.20) to $1.75 ($0.85+$0.70+$0.20).

Using the example above, the first item substitution method works as follows:

(1) The optimal group manager 121 starts with the most valuable $3.49 ungrouped item.

(2) The optimal group manager 121 then combines this item with all items that do not have an item level discount, which in this instance is only the $0.99 item, since the first three ungrouped items are associated with the two 20% off item coupons and the one 10% off item coupon.

(3) The total of the two item substitution items, $3.49 and $0.99, is computed as $4.48.

(4) Starting with the first Dollar Off Dollar off group that was formed, the optimal group manager 121 computes the maximum single item that can be replaced. In the example given, this is the amount that the original group total exceeds the minimum buy condition plus the item substitution total, which is ($14.96-$14.85)+$4.48 or $4.59.

(5) The items in the Dollar Off Dollar group are then checked to see if they can be replaced, starting with the most valuable item in the group.

(6) If the most valuable ungrouped item under consideration equals or exceeds or the value of the grouped item under consideration, this process halts and the optimal group manager 121 goes on to the next Dollar Off Dollar group, as the item substitution is not helpful. For example, if the most valuable item in the Dollar Off Dollar group happened to be $2.99, it does not make sense to replace it with the most valuable ungrouped $3.49 item as the total discount will drop. This logic also applies to the other ungrouped items, as each one is selected within the loop that starts at step one.

(7) In the example given, since the first grouped item is $4.24 is more than $3.49 (the current ungrouped item under consideration), but less than $4.59 (the maximum item that can be replaced), the $3.49 and $0.99 items are substituted for the $4.24 item. Once done the first item substitution method exits and the second item substitution is called.

(8) Had an item substitution not been found, the optimal group manager 121 would have proceeded with evaluating the next most valuable item in the group, and so on, until either the end of the group is reached or the first item of the item substitution group is equal to or greater than it.

(9) Had an item substitution still not been found, the optimal group manager 121 would walk through each of the following Dollar Off Dollar groups in turn.

(10) If an item substitution is still not found, the optimal group manager 121 then choses the next item from the ungrouped item list and so on, until all ungrouped items have been considered as a possible item substitution candidate.

The second item substitution method, while not applicable to the example given, works in a similar manner. What is different is that instead of using one of the ungrouped items that is assigned to an item level discount plus all the ungrouped items that are not assigned an item level discount, only the ungrouped items that are not currently assigned an item level discount are used. In the example given, this is only the $0.99 item, but had the following six items been left ungrouped:

$3.49, $3.49, $2.49, $1.99, $1.99, and $0.99

The three least valuable items as underlined (those not assigned to the two 20% off item coupons and one 10% off item coupon) would be combined for a possible item substitution, with the goal being to increase the value of one of the first three ungrouped items.

Note that the two item substitution techniques described above do not try all possible item substitution combinations, as this quickly leads to a N factorial situation that is far too time consuming. In this way, only the most promising item substitution combinations are tried.

These and other embodiments, are now discussed with reference to the FIGS. 2-4.

Figure 2:
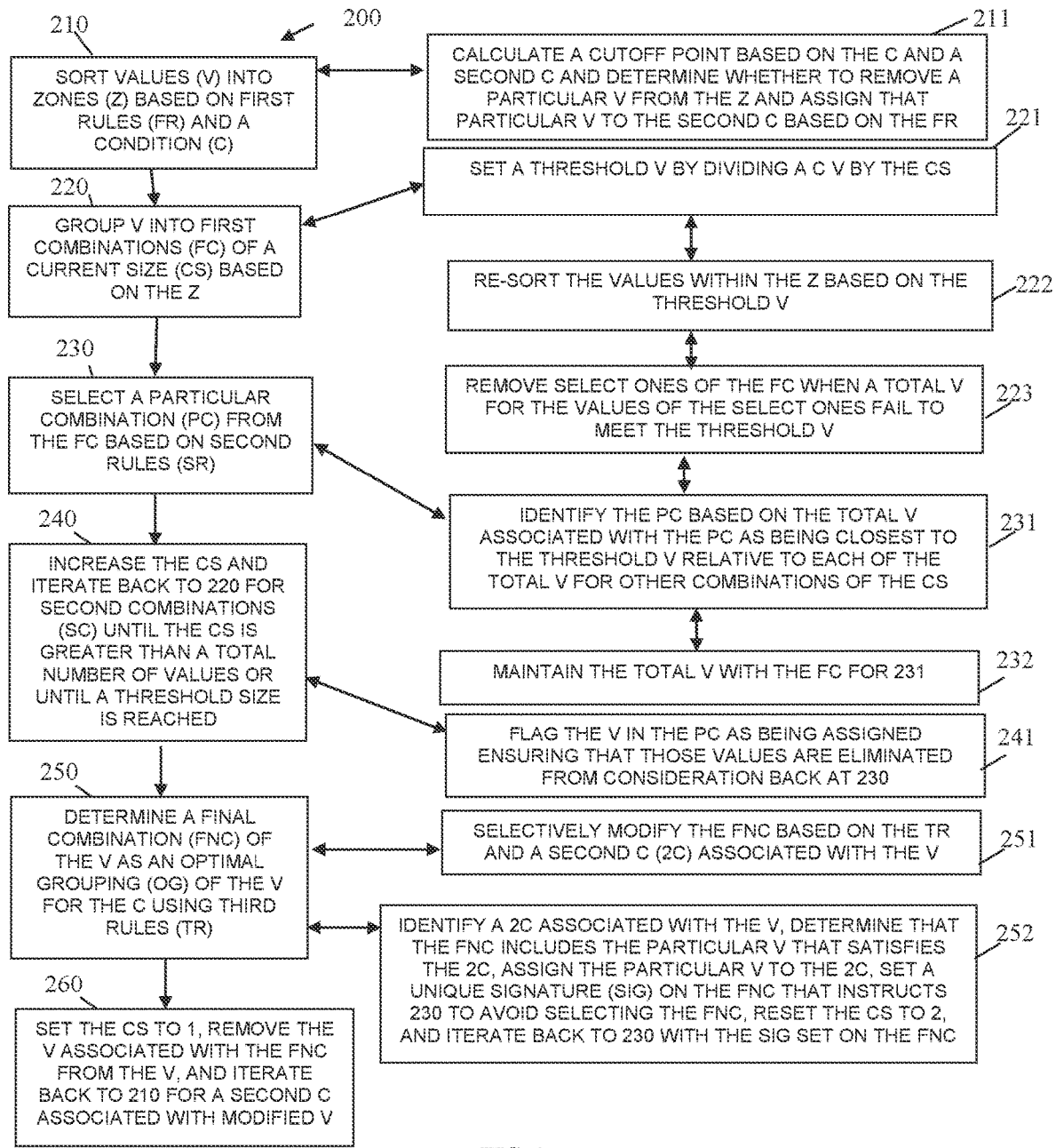
FIG. 2 is a diagram of a method for optimal transaction item group processing, according to an example embodiment.

FIG. 2 is a diagram of a method 200 for processing an optimal transaction item group processing, according to an example embodiment. The software module(s) that implements the method 200 is referred to as an "optimal grouping manager." The optimal grouping manager is implemented as executable instructions programmed and residing within memory and/or a non-transitory computer-readable (processor-readable) storage medium and executed by one or more processors of a device. The processor(s) of the device that executes the optimal grouping manager are specifically configured and programmed to process the optimal grouping manager. The optimal grouping manager may have access to one or more network connections during its processing. The network connections can be wired, wireless, or a combination of wired and wireless.

In an embodiment, the device that executes the optimal grouping manager is the server/cloud 120.

In an embodiment, the device that executes the optimal grouping manager is the transaction terminal 110. In an embodiment, the transaction terminal 110 is one of: a SST, a POS terminal, an ATM, and/or a kiosk.

In an embodiment, the optimal grouping manager is the optimal group manager 121, when executing on the server/cloud 120.

In an embodiment, the optimal grouping manager is the optimal group manager 112, when executing on the transaction terminal 110.

At 210, the optimal grouping manager sorts values into zones based on first rules and a condition associated with the values. The rules and conditions were discussed above with the FIG. 1 as the first processing step.

In an embodiment, there are four zones as discussed above with the FIG. 1.

In an embodiment, at 211, the optimal grouping manager calculates a cutoff point based on the condition and a second condition and determining whether to remove a particular value from the zones and assign that particular value to the second condition based on the first rules. In an embodiment, the condition is a first coupon or promotion and the second condition is a second coupon or promotion within the context of what was discussed above with the FIG. 1.

At 220, the optimal grouping manager groups the values into first combinations of a current size based on the zones. This was discussed above in the FIG. 1 as the second processing step.

In an embodiment, at 221, the optimal grouping manager sets a threshold value by dividing a condition value associated with the condition by the current size. That is a minimum amount that each sum of each combination has to meet or exceed to be considered.

In an embodiment of 221 and at 222, the optimal grouping manager re-sorts the values into the zones based on the threshold value. As stated before this allows for processor efficient comparisons with respect to the stated condition value.

In an embodiment of 222 and at 223, the optimal grouping manager removes select ones of the first combinations when a total value for the values of the select ones fail to meet the threshold value.

At 230, the optimal grouping manager selects a particular combination from the first combinations based on second rules. This was discussed above in the FIG. 1 as the second and third processing steps.

In an embodiment of 222 and 230 at 231, the optimal grouping manager identifies the particular combination based on the total values associated with the particular combination being closest to the threshold value relative to the total values for other combinations of the current size.

In an embodiment of 231 and at 232, the optimal grouping manager maintains total values for the particular combination and each of the other combinations for the identifying.

At 240, the optimal grouping manager increases the current size and iterates back to 220 for second combinations until the current size is greater than a total number of values or until a threshold size is reached.

In an embodiment, the threshold size is 6, such that no more than six iterations are performed.

In an embodiment, at 241, the optimal grouping manager flags the values associated with the particular combination ensuring that those values are eliminated for consideration back at 230.

At 250, the optimal grouping manager determines a final combination of the values as an optimal grouping of the values for the condition using third rules. This was discussed above with the FIG. 1.

In an embodiment, at 251, the optimal grouping manager selectively modifies the final combination before assigning as the optimal grouping based on the third rules and a second condition associated with the values.

In an embodiment, at 252, the optimal grouping manager identifies a second condition associated with the values, determines that the final combination includes the particular value that satisfies the second condition, assigns the particular value to the second condition, sets a unique signature on the final combination that instructs 230 to avoid selecting the final combination, resets the current size to 2, and iterates back to the 230 with the unique signature set on the final combination.

In an embodiment, at 260, the optimal grouping manager sets the current size to 1, removes the values associated with the final combination from the values, and iterates back to 210 for a second condition associated with modified values.

Figure 3:
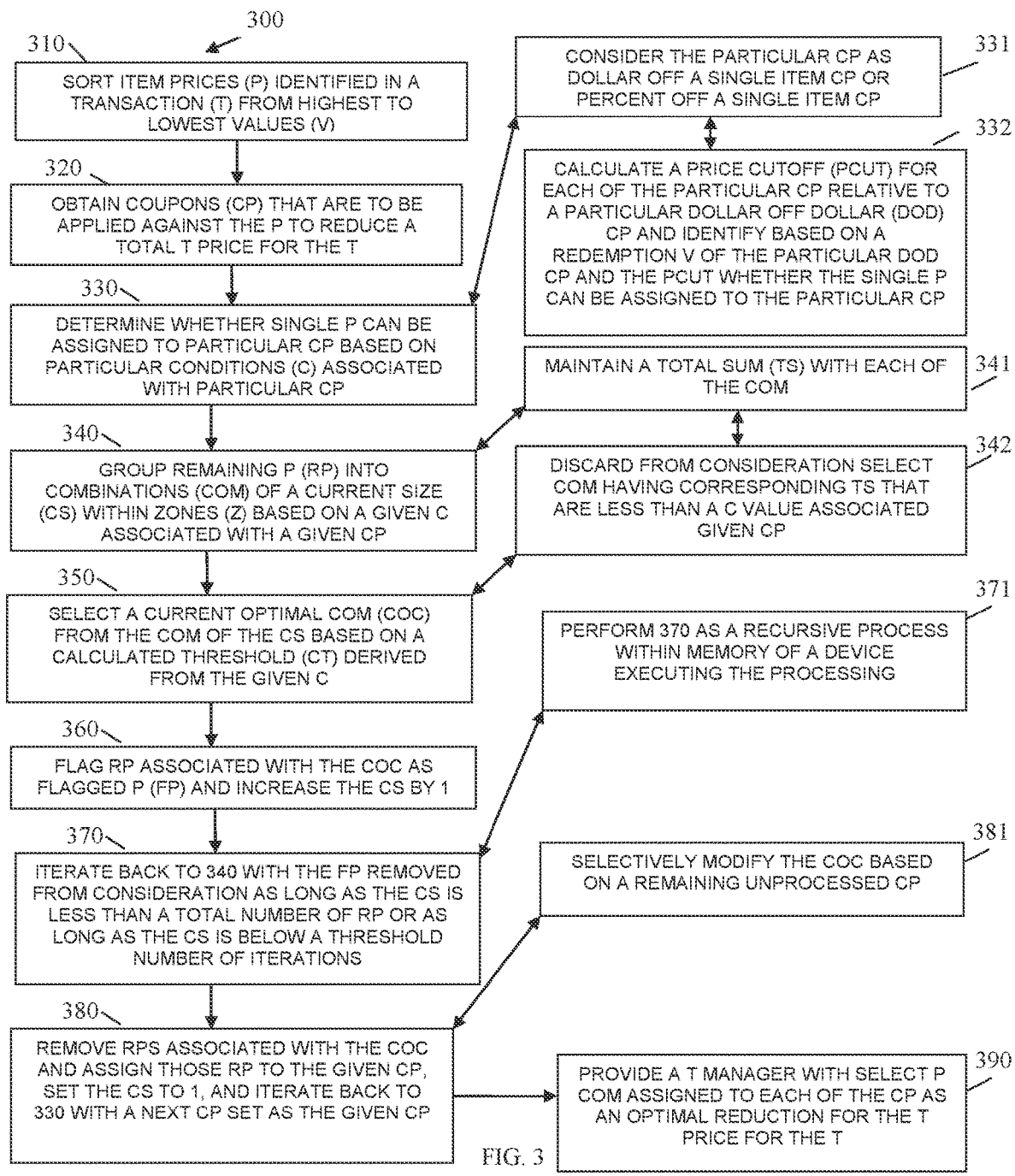
FIG. 3 is a diagram of another method for optimal transaction item group processing, according to an example embodiment.

FIG. 3 is a diagram of another method 300 for optimal transaction item group processing, according to an example embodiment. The software module(s) that implements the method 300 is referred to as an "optimal combination manager." The optimal combination manager is implemented as executable instructions programmed and residing within memory and/or a non-transitory computer-readable (processor-readable) storage medium and executed by one or more processors of a device. The processors that execute the optimal combination manager are specifically configured and programmed to process the optimal combination manager. The optimal combination manager may have access to one or more network connections during its processing. The network connections can be wired, wireless, or a combination of wired and wireless.

In an embodiment, the device that executes the optimal combination manager is the server/cloud 120.

In an embodiment, the device that executes the optimal combination manager is the transaction terminal 110. In an embodiment, the transaction terminal 110 is one of: a SST, a POS terminal, an ATM, and/or a kiosk.

In an embodiment, the optimal combination manager is all of some combination of: optimal group manager 112, the optimal group manager 121, and/or the method 200.

In an embodiment, the optimal combination manager presents another and in some ways enhanced processing perspective from that which was shown in the method 200 of the FIG. 2.

At 310, the optimal combination manager sorts item prices identified in a transaction from highest to lowest values.

At 320, the optimal combination manager obtains coupons that are to be applied against the item prices to reduce a total transaction price for the transaction.

At 330, the optimal combination manager determines whether single item prices can be assigned to particular coupons based on particular conditions associated with particular coupons.

In an embodiment at 331, the optimal combination manager considers the particular coupons as dollar off a single item coupons or percent off a single item coupons.

In an embodiment of 331 and at 332, the optimal combination manager calculates a price cutoff for each of the particular coupons relative to a particular dollar off dollar coupon and identifies based on a redemption value of the particular dollar off dollar coupon and the price cutoff whether the single item prices can be assigned to the particular coupons.

At 340, the optimal combination manager groups remaining item prices into combinations of a current size within zones based on a given condition associated with a given coupon.

In an embodiment, at 341, the optimal combination manager maintains a total sum with each of the coupons.

In an embodiment of 341 and at 342, the optimal combination manager discards from consideration select combinations having corresponding total sums that are less than a condition value associated given coupon.

At 350, the optimal combination manager selects a current optimal combination from the combinations of the current size based on a calculated threshold derived from the given condition.

At 360, the optimal combination manager flags remaining item prices associated with the current optimal combination as flagged item prices and increasing the current size by 1.

At 370, the optimal combination manager iterates back to 340 with the flagged item prices removed from consideration as long as the current size is less than a total number of remaining item prices or as long as the current size is below a threshold number of iterations.

In an embodiment, at 371, the optimal combination manager processes 370 are as a recursive process in memory of a device that executes the optimal combination manager.

At 380, the optimal combination manager removes remaining item prices associated with the current optimal combination and assigns those remaining item prices to the given coupon, sets the current size to 1, and iterates back to 330 with a next coupon set as the given coupon.

In an embodiment, at 381, the optimal combination manager selectively modifies the current optimal combination based on a remaining unprocessed coupon. Any of the above-discussed optimizations and substitution techniques discussed with the FIG. 1 can be processed by the optimal combination manager.

At 390, the optimal combination manager provides a transaction manager with select item price combinations assigned to each of the coupons as an optimal reduction for the transaction price for the transaction.

It is noted that the optimal combination manager is extremely processor efficient and is capable of processing a large number of item prices and coupons in milliseconds. The optimal combination manager also avoids the factorial problem as discussed above.

Figure 4:
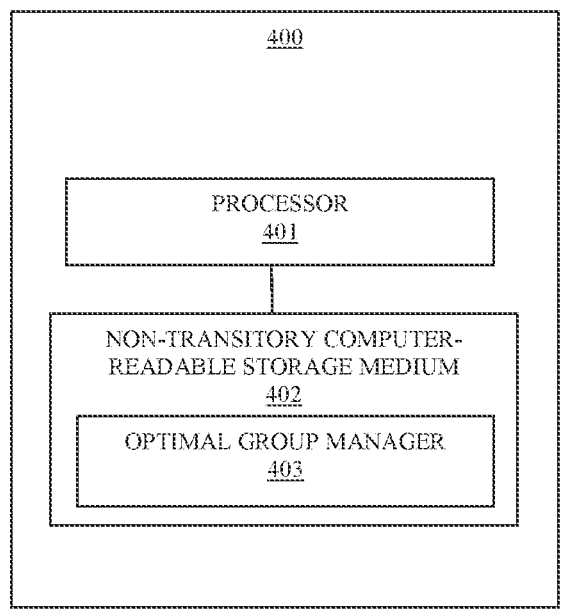
FIG. 4 is a diagram of another system for optimal transaction item group processing, according to an example embodiment.

FIG. 4 is a diagram of a system 400 for optimal transaction item group processing, according to an example embodiment. The system 400 includes a variety of hardware components and software components. The software components of the system 400 are programmed and reside within memory and/or a non-transitory computer-readable medium and execute on one or more processors of the terminal 400. The system 400 may communicate over one or more networks, which can be wired, wireless, or a combination of wired and wireless.

In an embodiment, the system 400 implements, inter alia, the processing described above with the FIGS. 1A-1B and 2-3.

The system 400 includes a processor 401, a non-transitory computer-readable storage medium 402 having executable instructions representing an optimal group manager 403.

The executable instructions when executed from the non-transitory computer-readable storage medium cause the processor to perform the processing of the optimal group manager 403.

The optimal group manager 403 is configured to: apply first rules to organize item prices based on coupons being redeemed at a transaction terminal during a transaction; recursively alter sizes of combinations of the item prices based on conditions associated with the coupons and second rules; identify an optimal combination for each coupon from the combinations; and selectively modify one or more of the optimal combinations based on third rules and unassigned ones of the coupons that have not been assigned to any of the item prices.

In an embodiment, the optimal group manager 403 is further configured to: provide the optimal combinations to a transaction manager 111 during the transaction at the transaction terminal 110 to reduce a total price associated with the transaction by a redemption amount associated with the optimal combination and the assigned coupons.

In an embodiment, the processor 401 is a hardware processor in the server/cloud 120.

In an embodiment, the processor 401 is a hardware processor in the transaction terminal 110. In an embodiment, the transaction terminal 110 is one of: a SST, a POS terminal, an ATM, and a kiosk.

In an embodiment, the optimal group manager 403 is all or some combination of: the optimal group manager 112, the optimal group manager 121, the method 200, and/or the method 300.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   providing executable instructions to a processor from a non-transitory computer-readable storage medium causing the processor to perform processing comprising;
   obtaining item identifiers for items of a transaction as the item identifiers are received and processed at a transaction terminal, wherein obtaining further includes obtaining a last item identifier for a last item indicating that each of the items for the transaction have been identified;
   obtaining coupons for the corresponding items, coupon redemption values, and coupon conditions for the coupons based on the item identifiers and after identifying that the last item identifier was obtained;
   segmenting out first item identifiers and first available coupons based on first coupon redemption values;
   selectively grouping remaining item identifiers in combinations based on a combination size;
   selecting a particular combination for a particular coupon based on the corresponding coupon conditions;
   recursively iterating back to the selectively grouping for a next coupon and the corresponding coupon conditions after increasing the combination size for the combinations by 1 until a threshold is reached, wherein recursively iterating further includes recursively grouping item values by increasing the combination size each iteration until a threshold combination size is reached;
   identifying a final combination of the item identifiers from each of the particular combinations and combining the final combination with the first item identifiers as an optimal grouping of the item identifies for the coupons of the transaction; and
   providing the optimal grouping of item identifiers to the transaction terminal to apply against a transaction price for the transaction.

2. The method of claim 1 further comprising, processing the method and finding the optimal grouping without factorial processing during the transaction.

3. The method of claim 1, wherein obtaining the item identifiers further includes sorting the item identifiers by item price from highest to lowest.

4. The method of claim 1, wherein obtaining the coupons further includes calculating a price cut off value for each item identifier that is applicable to two of the coupons with a first of the two coupons associated with a dollar off value for the corresponding item identifier and a second of the two coupons associated percent off value based for the corresponding item identifier.

5. The method of claim 4, wherein calculating each corresponding price cut off as the corresponding dollar off value multiplied by a product obtained by dividing 100 by the corresponding percent off value.

6. The method of claim 5, wherein segmenting further includes identifying the first item identifiers as having a corresponding price cut off that exceeds the corresponding dollar off value associated with a first of the two coupons.

7. The method of claim 6, wherein segmenting further includes assigning the corresponding percent off values associated with the corresponding coupons to the first item identifiers, removing the corresponding coupons and the first identifiers from further consideration by the method, and assigning the first item identifiers and the corresponding coupons to the optimal grouping.

8. The method of claim 1, wherein segmenting further includes identifying second item identifiers, each second item identifier associated with a single one of the coupons having a corresponding coupon redemption value that falls between a first threshold value and a second threshold value.

9. The method of claim 8, wherein segmenting further includes assigning each of the second item identifiers and the corresponding coupons to the optimal grouping and removing the second item identifiers and the corresponding coupons from further consideration by the method.

10. The method of claim 1, wherein segmenting further includes identifying second item identifiers, each second item identifier associated with two or more of the coupons wherein each of the two or more corresponding coupon redemption values for each of the two or more coupons exceeds a first threshold by less than a predetermined percentage.

11. The method of claim 10, wherein segmenting further includes iterating each second item identifier in select groupings with the two or more coupons beginning with a smallest available grouping and comparing the corresponding coupon redemption values until a previous coupon redemption value for a previous select grouping exceeds a current coupon redemption value for a current select grouping, stopping the iterating for the corresponding second item identifier, selecting the corresponding coupons associated with the previous select grouping, assigning the corresponding second item identifiers and the corresponding coupons to the optimal grouping and removing the second item identifiers and the corresponding coupons from further consideration by the method.

12. A method comprising:
   obtaining item identifiers for items of a transaction as the item identifiers are received and processed at a transaction terminal, coupons presented for the transaction, coupon conditions for the coupons, and coupon redemption values for the coupons, wherein the coupons are obtained after identifying that a last item identifier for a last item is obtained for the transaction by the transaction terminal;
   sorting the item identifiers by prices associated with the items;
   assigning the item identifiers to the coupons based on the coupon conditions;
   identifying first item identifiers associated with single coupons;
   determining first item identifiers associated with two or more of the coupons based on a comparison of the corresponding coupon redemption values for each of the first item identifiers and each of the corresponding two or more of the coupons;
   discarding each remaining one of the two coupons from consideration with the coupons that are not associated with a highest coupon redemption value for the corresponding first item identifiers;

identifying second item identifiers associated with second coupons that have corresponding coupon redemption values that fall between a first threshold and a second threshold;

assigning the first item identifiers and the second item identifiers along with their corresponding coupons to an optimal grouping of the item identifiers and the coupons;

recursively combining remaining item identifiers in combinations with one another for consideration of assignment to a particular remaining coupon and selecting a particular combination for each particular remaining coupon having a highest coupon redemption value, wherein recursively combining further includes recursively grouping item values by increasing a combination size each iteration until a threshold combination size is reached;

assigning each particular combination from the recursively combining to the optimal grouping; and providing the optimal grouping to the transaction terminal during the transaction for as an optimal price reduction of a transaction price associated with the item identifiers when provided the coupons for the transaction.

13. The method of claim 12, wherein assigning the first item identifiers and the second item identifiers further comprises, assigning third item identifiers along with determined coupons from the remaining coupons to the optimal grouping and removing the third identifiers from the remaining item identifiers and removing the determined corresponding coupons from the remaining coupons from further consideration.

14. The method of claim 13, wherein assigning the third item identifiers further identifying third item identifiers, each third item identifier associated with two or more of the remaining coupons, labeling the corresponding two or more of the remaining coupons applicable to the third item identifiers based on the corresponding coupon conditions as the determined coupons, wherein each of the two or more corresponding coupon redemption values for each of the two or more of the remaining coupons exceeds a third threshold by less than a predetermined percentage.

15. The method of claim 14, wherein assigning the third item identifiers further includes iterating each third item identifier in select groupings with the two or more of the determined coupons beginning with a smallest available grouping and comparing the corresponding coupon redemption values until a previous coupon redemption value for a previous select grouping exceeds a current coupon redemption value for a current select grouping, stopping the iterating for the corresponding third item identifier, selecting the corresponding coupons associated with the previous select grouping, assigning the corresponding third item identifiers and the corresponding determined coupons to the optimal grouping and removing the third item identifiers and the corresponding determined coupons from further consideration by the method.

16. The method of claim 12, wherein recursively combining further include increasing a size of each combination for each recursive iteration by 1 until a threshold number of iterations are reached or until a currency size of a current combination exceeds a total number of remaining item identifiers.

17. The method of claim 12, wherein recursively combining further includes removing for each next recursive iteration the corresponding remaining item identifiers and the corresponding particular remaining coupon associated with the corresponding particular combination from further consideration during the next recursive iteration.

18. The method of claim 12 further comprising, processing the method to solve a factorial problem without performing factorial processing.

19. A transaction terminal, comprising:

a processor;

a non-transitory computer-readable storage medium comprising executable instructions; and the executable instructions when executed by the processor from the non-transitory computer-readable storage medium cause the processor to perform operations comprising:

receiving and processing item identifiers for items as received at the transaction terminal;

sorting the item identifiers for the items by item prices for a transaction at the transaction terminal after receiving and identifying a last item identifier for a last item associated with the transaction;

identifying coupons presented for the transaction after identification of the last item identifier;

obtaining coupon conditions;

assigning each item identifier to one or more of the coupons based on the coupon conditions;

determining coupon redemption values for each coupon based on the coupon conditions, the item prices, and the assigning;

assigning first item identifiers and first coupons to an optimal grouping based on coupons associated with single items and price cut off values calculated from the corresponding coupon redemption values of the first coupons and the corresponding item prices of the first item identifiers;

assigning second item identifiers and second coupons to the optimal grouping based on corresponding coupon redemption values that fall between a first threshold and a second threshold;

assigning third item identifiers and third coupons to the optimal grouping based on corresponding coupon redemption values that fall above a third threshold by less than a predetermined amount;

recursively combining remaining item identifiers in a current combination having a current combination size for a particular remaining coupon, determining the current combination coupon redemption value, increasing the current size and updating the current combination until the current size is greater than a total number of remaining item identifiers or until a threshold number of iterations is reached, wherein recursively combining further includes recursively grouping item values by increasing the current size each iteration until a threshold combination size is reached;

selecting the current combination having a highest current combination redemption value from the recursively combination as an optimal combination;

removing the third item identifiers associated with the optimal combination from the remaining item identifiers and removing the particular remaining associated with the optimal combination from remaining coupons;

assigning the optimal combination to the optimal grouping;

obtaining a next remaining coupon and iterating back to the recursively combining until each remaining coupon is processed; and applying a total coupon redemption value associated with the optimal grouping against a total transaction price for the transaction.

20. The transaction terminal of claim 19, wherein the transaction terminal is a Self-Service Terminal (SST), a Point-of-Sale (POS) terminal, an Automated Teller Machine (ATM), or a kiosk.

* * * * *